United States Patent [19]

Richiuso et al.

[11] Patent Number: 5,323,201
[45] Date of Patent: Jun. 21, 1994

[54] CASSETTE EJECTING APPARATUS

[75] Inventors: Leonard Richiuso; David C. Smart; John K. McBride; Joel S. Lawther, all of Rochester, N.Y.

[73] Assignee: Eastman Kodak Company, Rochester, N.Y.

[21] Appl. No.: 72,619

[22] Filed: Jun. 4, 1993

[51] Int. Cl.$^5$ .................. G03B 17/26; G03B 17/02; G03B 1/04
[52] U.S. Cl. ............................ 354/288; 354/275; 242/71.1
[58] Field of Search ............... 354/288, 281, 275; 242/71.1

[56] References Cited

U.S. PATENT DOCUMENTS

| | | | |
|---|---|---|---|
| 3,033,258 | 5/1962 | Pollard et al. | 150/52 |
| 4,324,476 | 4/1982 | Seely | 354/288 |
| 4,666,036 | 5/1987 | Bourbon | 206/45.23 |
| 4,741,433 | 5/1988 | Irvine | 206/1.5 |
| 5,049,914 | 9/1991 | Dassero | 354/288 |
| 5,142,316 | 8/1992 | Tanii et al. | 354/212 |
| 5,159,365 | 10/1992 | Takahashi et al. | 354/21 |
| 5,179,402 | 1/1993 | Komatsuzaki | 354/212 |

FOREIGN PATENT DOCUMENTS 3290637 12/1991 Japan.
3296029 12/1991 Japan.
4001624 1/1992 Japan.
4030136 2/1992 Japan.

Primary Examiner—Russell E. Adams
Assistant Examiner—Nicholas J. Tuccillo
Attorney, Agent, or Firm—Roger A. Fields

[57] ABSTRACT

A photographic camera comprises a camera body with a loading chamber for receiving a film cassette endwise, a door supported for pivotal closing and opening movement to cover and uncover the chamber, a latch for preventing pivotal opening movement of the door but which can be disabled to permit the door to be opened, and an ejecting device for pushing the cassette endwise at least part way out of the chamber. According to the invention, the ejecting device includes a single piece means supported for movement in an ejecting direction for first disabling the latch to permit the door to be opened and then pushing the cassette endwise at least part way out of the chamber when the door is opened.

5 Claims, 4 Drawing Sheets

CASSETTE EJECTING APPARATUS

BACKGROUND OF THE INVENTION

1. Field of the Invention

The invention relates generally to the field of photography, and in particular to apparatus for ejecting a film cassette at least part way out of a cassette receiving chamber located in the body of a camera.

2. Description of the Prior Art

Commonly assigned U.S. Pat. No. 5,049,914, issued Sep. 17, 1991, discloses a photographic camera comprising a camera body with a loading chamber for receiving a film cassette endwise, i.e. axially, a door supported for pivotal closing and opening movement to cover and uncover the chamber, latching means for preventing pivotal opening movement of the door but which can be disabled to permit the door to be opened, and ejecting means for pushing the cassette endwise at least part way out of the chamber when the door is opened. Specifically, the ejecting means includes an over-center linkage that first is shifted to slightly beyond a centered position, without moving a film cassette in the chamber, responsive to the door being opened manually a limited amount, and then by virtue of its construction shifts itself further from its centered position (without having to continue to manually open the door) to automatically further open the door and push the cassette at least part way out of the chamber.

3. Problem to be Solved by the Invention

In U.S. Pat. No. 5,049,914, the latching means must be disabled manually before the door can be opened.

SUMMARY OF THE INVENTION

A photographic camera comprising a camera body with a loading chamber for receiving a film cassette endwise, a door supported for pivotal closing and opening movement to cover and uncover the chamber, latching means for preventing pivotal opening movement of the door but which can be disabled to permit the door to be opened, and ejecting means for pushing the cassette endwise at least part way out of the chamber, is characterized in that:

the ejecting means includes single piece means supported for movement in an ejecting direction for first disabling the latching means to permit the door to be opened and then pushing the cassette endwise at least part way out of the chamber when the door is opened.

DETAILED DESCRIPTION OF THE PREFERRED EMBODIMENT

Figure 1:
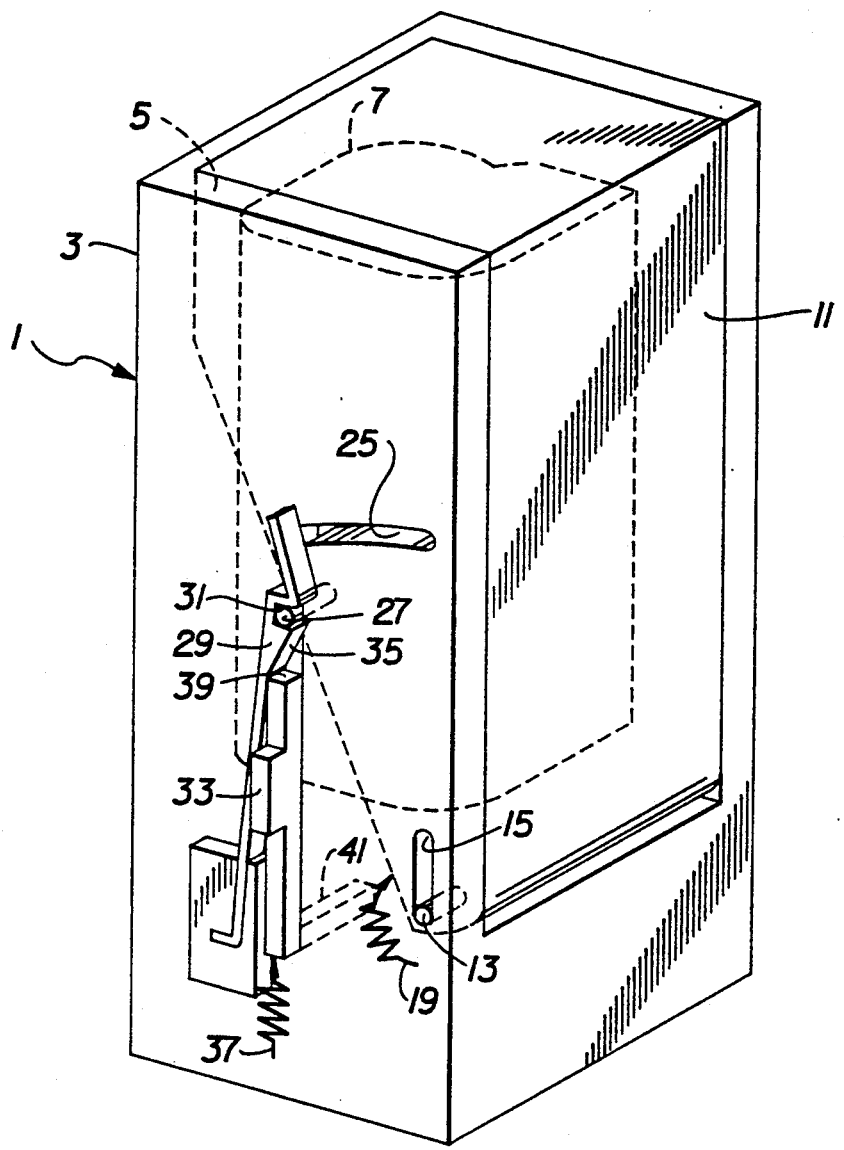
FIGS. 1–4 are perspective views of an end portion of a camera body including cassette ejecting apparatus according to a preferred embodiment of the invention, showing successive steps of the operation of the cassette ejecting apparatus.

The invention is disclosed as being embodied preferably in a 35 mm still-picture camera. Because the features of this type camera are generally well known, the description which follows is directed in particular to camera elements forming part of or cooperating directly with the preferred embodiment. It is to be understood, however, that other elements not shown or described may take various forms known to one of ordinary skill in the art.

Referring now to the drawings, FIGS. 1–4 show an end portion 1 of a camera body 3 with a loading chamber 5 for receiving a film cassette 7 endwise, i.e. axially, through a top (or bottom) opening 9 to the chamber. The cassette 7 is similar to the cassette depicted in U.S. Pat. No. 5,049,914.

Figure 3:
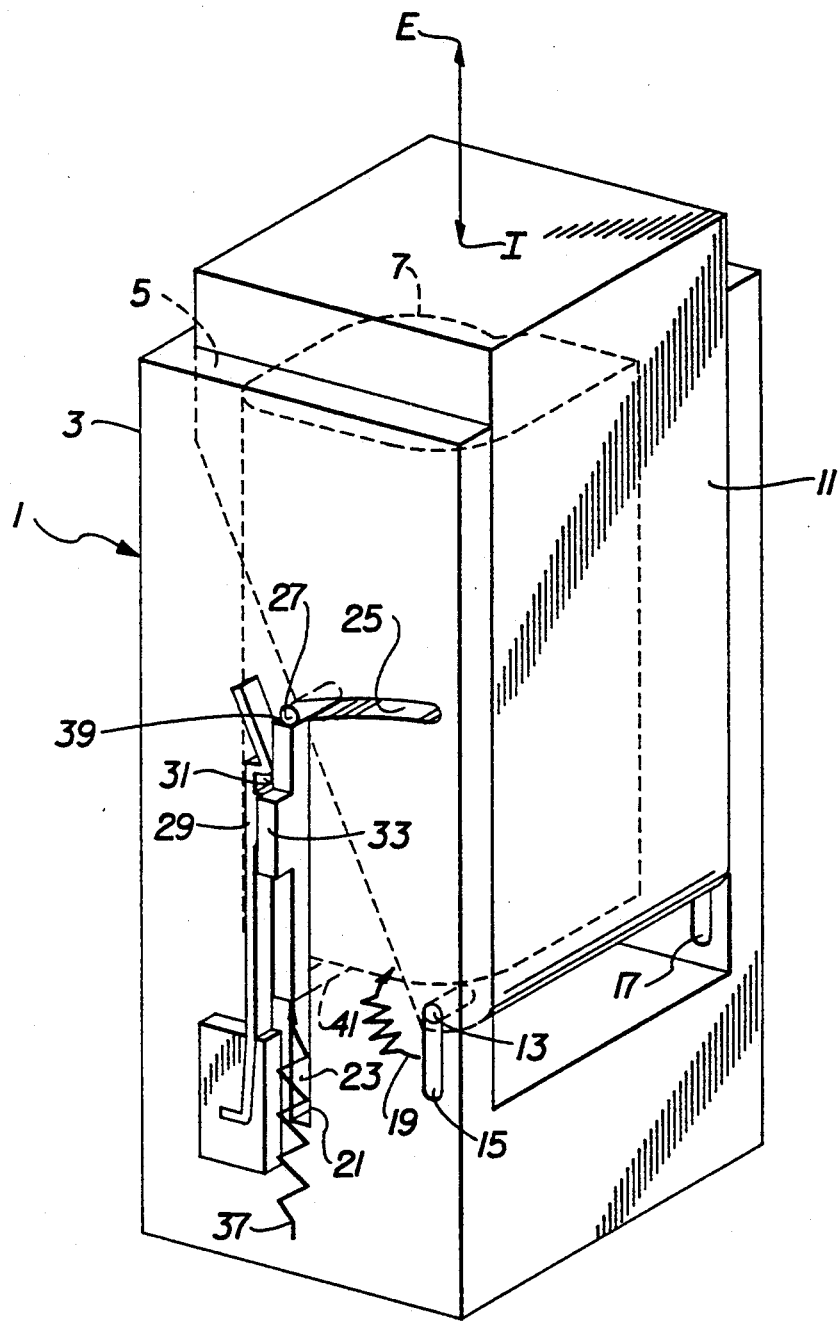
Figure 4:
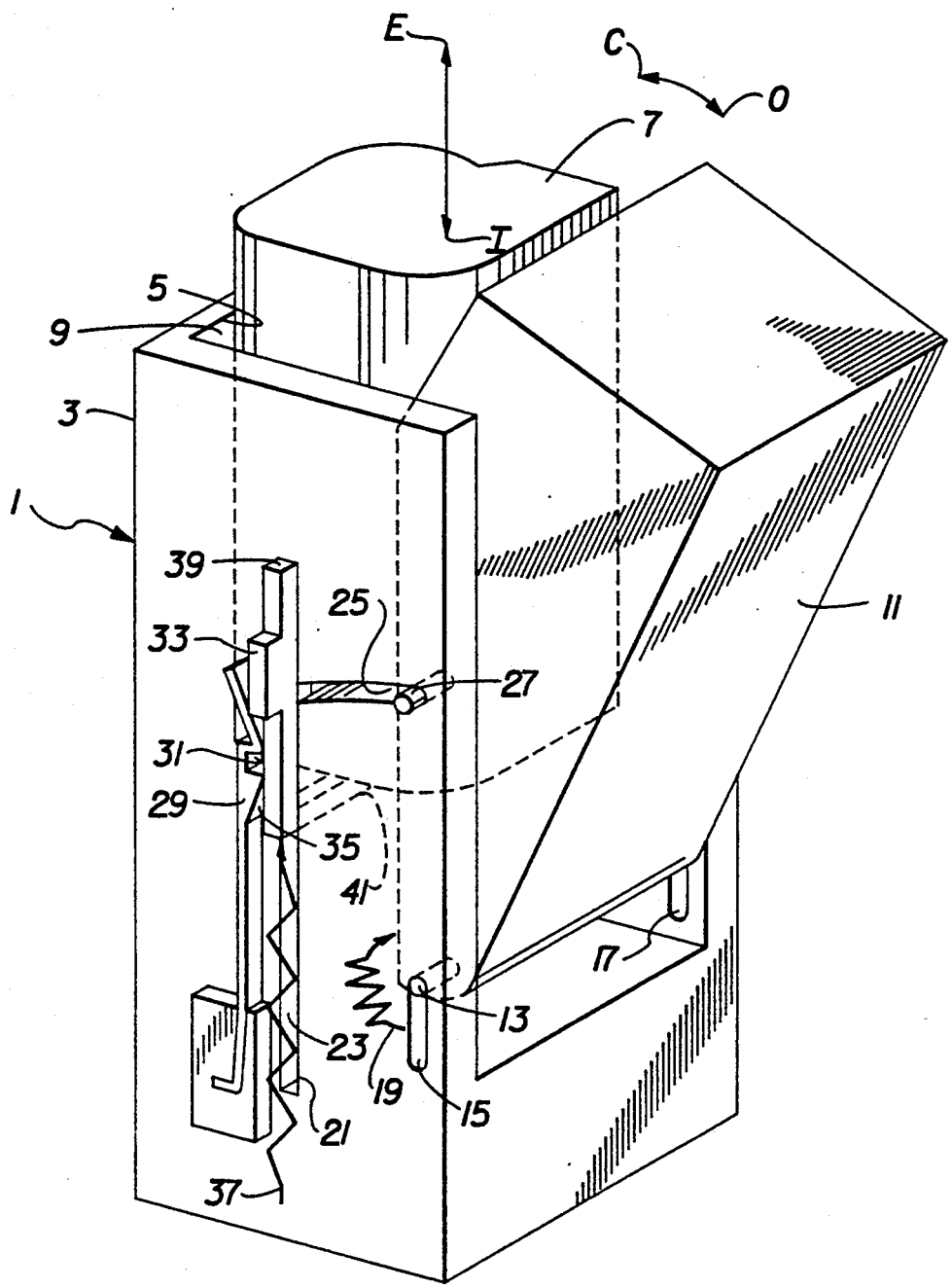

A door 11 normally for sealing the chamber 5 as shown in FIG. 1 is supported for translational movement along the chamber in the opposite directions E and I as shown in FIG. 3 and for pivotal opening and closing movement in the opposite directions O and C as shown in FIG. 4, via a pivot pin 13 whose opposite ends (only one shown) extend into respective interior slots 15 and 17 formed in the end portion 1 at the chamber to extend in the opposite directions E and I. A schematically shown torsion spring 19 biases the door 11 to pivot open in the direction O.

An interior guide slot 21 is formed in the end portion 1 at the chamber 5 with a first section 23 extending in the opposite directions E and I and a second section 25 extending transversely from the first section in the direction O. The door 11 includes a guide pin 27 fixed to it that is held captive in the guide slot 21 to prevent the door from being pivoted open in the direction O by the torsion spring 19 when the pin is within the first section 23 of the slot 21 as shown in FIGS. 1 and 2 and to permit the door to be pivoted open a limited amount by the spring when the pin is within the second section 25 of the slot as shown in FIGS. 3 and 4.

An exterior, resiliently flexible latch 29 is anchored at one end to the end portion 1 and has a locking notch 31 adjacent another end for releaseably engaging the guide pin 27 to hold the pin in the first section 23 of the guide slot 21. A single piece ejecting slide 33 is held captive in the first section 23 of the guide slot 21 for sliding movement manually along the first section in the direction E against an inclined surface 35 of the latch 29 to deflect the latch 29 to disengage its notch 31 from the guide pin 27. See FIGS. 1 and 2.

Figure 2:
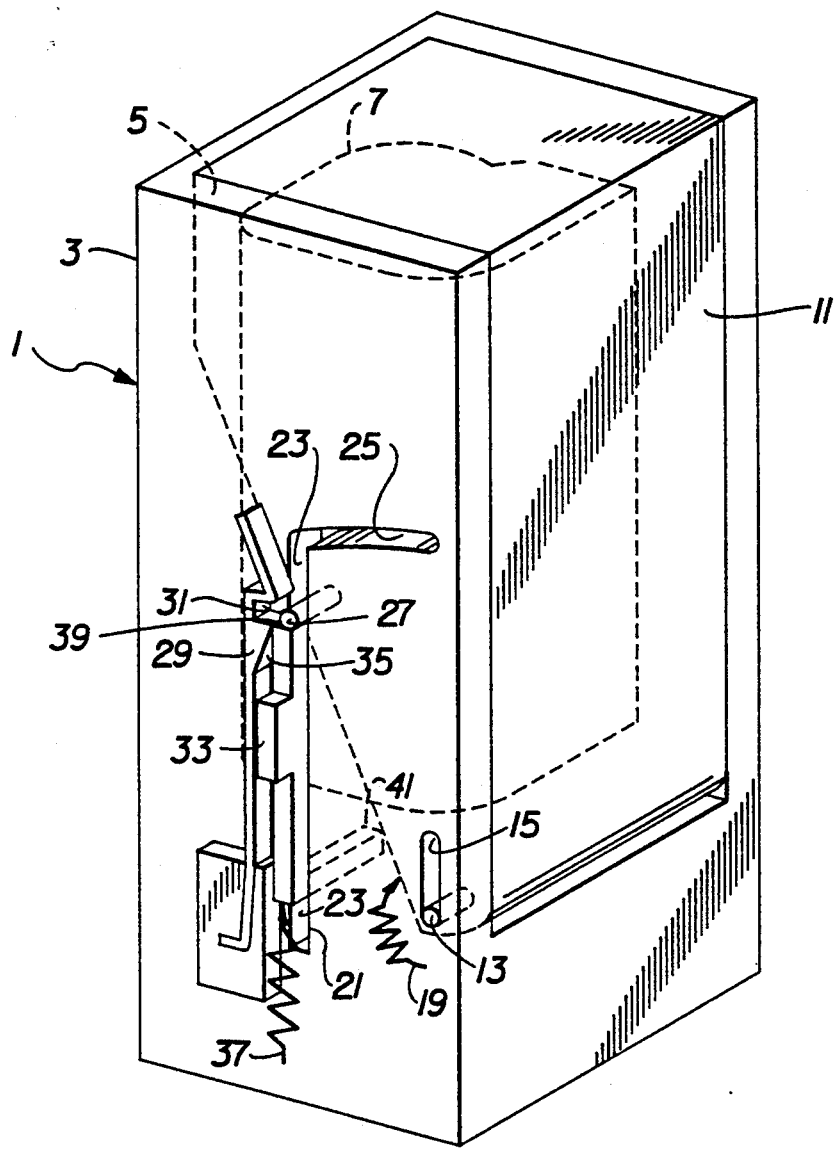

When the notch 31 is disengaged from the guide pin 27 as shown in FIG. 2, a schematically shown compression spring 37 is free to urge the slide 33 in the direction E as shown in FIG. 3 to move a forward end 39 of the slide against the pin to move the door 11 via the pin in the direction E until the pin is moved into the second section 25 of the slot. Similarly, an integral finger-like extension 41 of the slide 33 moves the cassette 1 with the door 11 in the direction E. The torsion spring 19 is then free to pivot the door 11 open in the direction O as shown in FIG. 4. When the guide pin 27 is moved out of the way of the forward end 39 of the slide 33 as shown in FIG. 4, the finger-like extension 41 of the slide continues to move the cassette 7 in the direction E to at least part way out of the chamber 11.

The invention has been described with reference to a preferred embodiment. However, it will be appreciated that variations and modifications can be effected by one of ordinary skill in the art without departing from the scope of the invention.

Parts List for FIGS. 1–4

1. end portion
3. camera body
5. loading chamber
7. film cassette
9. chamber opening
11. door
13. pivot pin 15 & 17. slots
19. spring
21. guide slot
23 & 25. first and second sections
27. guide pin
29. latch
31. notch
33. slide
35. inclined surface
37. spring
39. slide forward end
41. slide extension

We claim:

1. A photographic camera comprising a camera body with a loading chamber for receiving a film cassette endwise, a door supported for pivotal closing and opening movement to cover and uncover said chamber, latching means for preventing pivotal opening movement of said door but which can be disabled to permit the door to be opened, and ejecting means for pushing the cassette endwise at least part way out of said chamber, is characterized in that:

said ejecting means includes single piece means supported for movement in an ejecting direction for first disabling said latching means to permit said door to be opened and then pushing the cassette endwise at least part way out of said chamber when the door is opened.

2. A photographic camera as recited in claim 1, wherein said ejecting means includes a spring for moving said single piece means in said ejecting direction to push the cassette endwise at least part way out of said chamber, and said latching means includes movable restraining means located in the way of said single piece means for preventing said spring from moving said single piece means in said ejecting direction to disable the latching means but which can be moved out of the way of the single piece means responsive to the single piece means being manually pushed in the ejecting direction.

3. A photographic camera as recited in claim 2, wherein said camera body includes a guide slot having a first section extending in said ejecting direction and a second section extending transversely from said first section in an opening direction said door is opened, said door is supported for translational movement in said ejecting direction besides being supported for pivotal closing and opening movement and includes a guide pin located in said guide slot to prevent the door from being opened when said pin is within said first section of the slot and to permit the door to be opened when the pin is within said second section of the slot, said single piece means includes integral means for pushing said pin in said ejecting direction along said first section of said slot to said second section of the slot to move said door in the ejecting direction, and a spring is arranged to move said door open when said pin is within said second section of said slot.

4. A photographic camera comprising a loading chamber for receiving a film cassette endwise, a door for covering said chamber, and ejecting means for moving the cassette out of said chamber, is characterized in that:

said door is supported first for translational movement part way from said chamber and then for pivotal movement further from the chamber to open the door; and said ejecting means includes movable means for translationally moving said door and the cassette part way from said chamber and for translationally moving the cassette without the door further from the chamber when the door is pivotally moved further from the chamber.

5. A photographic camera as recited in claim 4, wherein latching means prevents movement of said door but can be disabled to permit the door to be moved, and said movable means includes integral means for disabling said latching means.

* * * * *